Oct. 26, 1937.  T. B. FLANAGAN  2,097,026

SCALE

Filed March 9, 1935  2 Sheets-Sheet 1

INVENTOR.
Thomas B. Flanagan
BY
W. S. Babcock
ATTORNEY.

Oct. 26, 1937.　　　　T. B. FLANAGAN　　　　2,097,026
SCALE
Filed March 9, 1935　　　　2 Sheets-Sheet 2

*INVENTOR.*
Thomas B. Flanagan
BY
H. S. Babcock
*ATTORNEY.*

Patented Oct. 26, 1937

2,097,026

UNITED STATES PATENT OFFICE 2,097,026

SCALE

Thomas B. Flanagan, Columbus, Ohio

Application March 9, 1935, Serial No. 10,294

8 Claims. (Cl. 265—54)

The invention to be hereinafter described relates to scales.

It is particularly adapted to scales of the over and under weight indicating type, now well known on the market.

The greatest field for this type of scale is that of predetermined weight. In large wholesale establishments, etc., products of many kinds are put up in cans, bags, cartons, etc. of carefully calculated approximate weight. The respective weights must be exact or very close, within acceptable tolerances. Briefly, the scales are used to detect discrepancies. For each predetermined weight, the respective scale is set so that the exact weight will just balance the beam. In this type of scale, the mechanism and assembly is such that there is limited oscillation of the beam within definite tolerances, and very sensitive indication of all variations within such limits. Thus, products of under weight are checked out or the deficiency corrected on the scale, and the same as to excessive over weight. This general type of scale is well known on the market under the trade name of Exact Weight Scale, and is clearly illustrated in the U. S. Patent 1,405,634 to Walter S. Smith, dated Feb. 7, 1922. Obviously, the scale may also be used in retail or "over the counter" sales, as well.

Heretofore, scales of this type, in the balanced beam form, have been made and used in large quantities in almost every field. In order to adequately amplify the reading of the slight variations within the allowed tolerances, so that they may be easy and quick, a considerable "tower" structure must be resorted to, involving considerable mechanism and taking up considerable space. Necessarily, such "tower" structure adds appreciably both to the cost of production and to the cost of upkeep. In the balanced beam form, the platters are carried by outriders mounted on knife-edge pivots on the beam, equidistant from the fulcrum, the outriders carrying stems to which a check rod is pivotally connected, the check rod being pivoted to the center post of the yoke in which the beam is suitably fulcrumed. The center post, beam fulcrum and pivot between the center post and check rod are all in the same plane, the center post being stationary. When assembled, the beam, check rod and outrider stems constitute a flexible parallelogram. This assembly, as is well known, compels proper, true vertical travel of the platters. The check rod is connected to the center post and stem ends by the usual pivot pin and pin-hole. Each pivot pin and pin-hole is a vulnerable spot. In damp or corrosive atmospheres these points rust rapidly and soon "freeze" and become inoperative. In practical manufacture, there must be a certain degree of freedom at such pivot points. In use, there is friction. The friction of use causes wear and looseness, with resulting lost-motion and corresponding inaccuracies in weighing. In weighing, the object or counter-weight is seldom placed directly centrally over the platter knife-edge. It is usually either somewhat toward the beam fulcrum or somewhat beyond the platter knife-edge. That, of course, results in a considerable thrust, either outwardly from the center post or inwardly toward it, and in proportion to the distance between the outrider knife-edge and the center of mass on the respective platter. This resulting thrust is effective at the pin-and-pinhole pivot connection between the check rod end and outrider stem end. This binding and increased friction makes inaccuracies in weighing.

The present invention has been designed more particularly to provide an indicator for scales of the type described, which will avoid all of the above and many other objections and difficulties presented by the tower type of scale, and to provide a simple, efficient, compact and economical scale of the least practical number of parts, which will operate satisfactorily in all atmospheres and conditions in which such a scale is desired, and one which, after each weighing operation, will promptly return to balance or zero.

For purposes of demonstration, a simple and well known balanced beam type of scale is illustrated, with the invention applied, as such type is already well known on the market and familiar to the public. The invention may be readily applied to various other types of scales.

In order to more clearly disclose the construction, operation and use of the invention, reference should be had to the accompanying drawings forming part of the present application. Throughout the several figures of the drawings, like reference characters designate the same parts.

In the drawings:—

Figure 1:
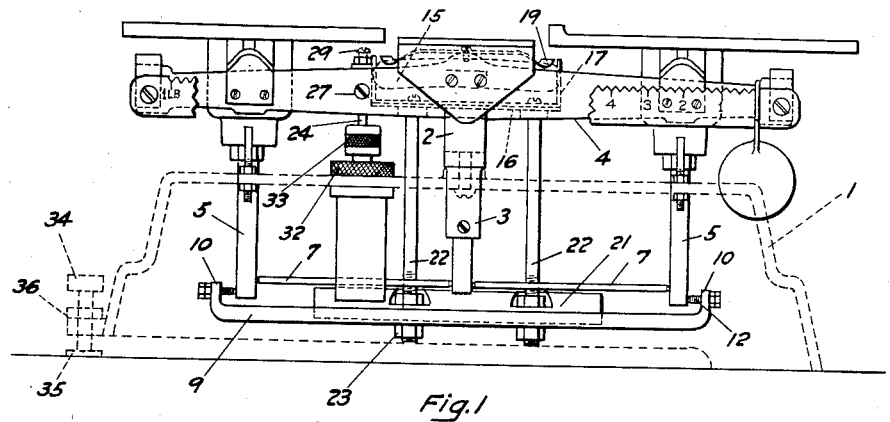
Fig. 1 is a side elevation, balanced, with the base and jack-screw shown in dotted lines and poise weight beam broken away.
Figure 2:
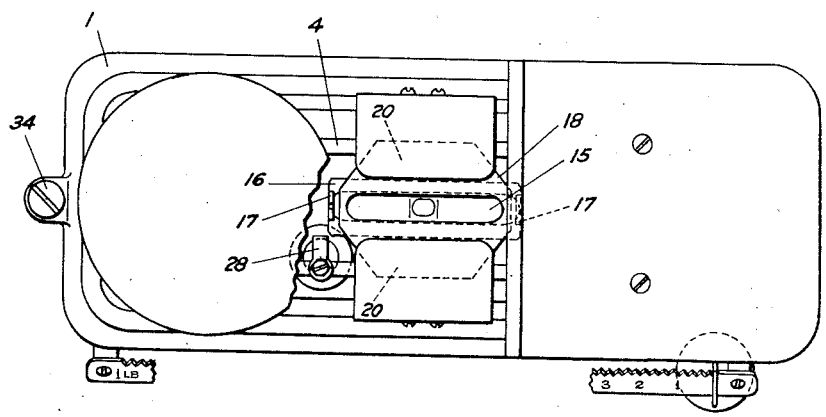
Fig. 2 is a top plan view of Fig. 1.
Figure 5:
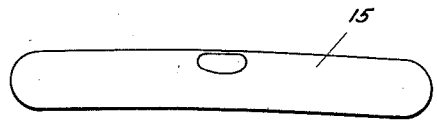
Fig. 5 is an enlarged side elevation of the level tube, removed.
Figure 4:
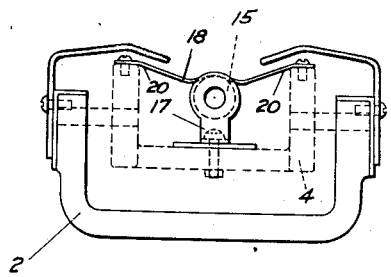
Fig. 4 is a left hand end view of Fig. 3.
Figure 3:
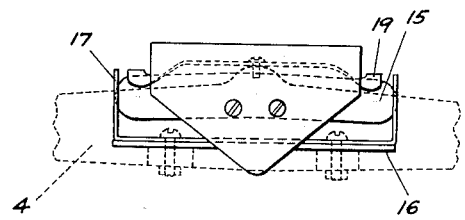
Fig. 3 is an enlarged side elevation of the level and its mounting, with balance beam indicated in dotted lines.
Figure 6:
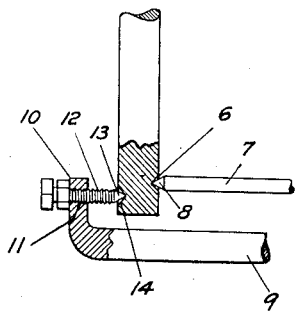
Fig. 6 is an enlarged longitudinal cross section through the lower end of one outrider stem, showing connections in elevation; and, Fig. 7 is an enlarged cross section detail showing the connection between the beam and dashpot, on line 7—7 of Fig. 1.

Referring to the drawings in detail, the base 1, yoke 2, center post 3, beam 4, outriders and outrider stems 5 are all of usual and well known construction, arrangement and disposition. The beam and outriders are mounted in usual and well known manner on any suitable knife-edge pivots.

The lower part of each outrider stem 5 is provided with a conical end-thrust bearing seat or socket 6 adapted to freely removably seat the conical end-thrust bearing 8 of a check rod 7 having a similar end-thrust bearing on its opposite end adapted to be similarly seated in a socket in the center post 3, similar to socket 6. Two such rods are provided, in the preferred construction, each extending from one outrider stem to the center post 3. The sockets 6 are of greater angle of incline than the bearings 8, as will be clear on reference to the drawings. This provides a free conical space concentrically disposed between each pair or couple, so that rods 7, while spacing the stems from center post 3 are, nevertheless freely revoluble. They are, therefore, self cleaning and present least opportunity for rust and dust. It is, of course, essential to maintain these rods in operative position. For that purpose, a yoke bar 9 is provided. It is of such length as to extend from the outer side of one outrider stem to the outer side of the other and has its extreme ends offset to provide branches 10 which, with the body of the bar, form a wide, shallow U. These branches are provided with threaded bores 11 through which screws 12 are turned. Preferably, screws 12 are each provided with either rounded or conical ends 13 adapted to be seated in correspondingly shaped sockets 14, the respective sockets being somewhat larger than the ends 13. By positioning the yoke 9 and turning in the screws 12, after rods 7 have been properly seated, the stems 5 may be prevented from swinging to a position which would free and drop the rods 7 and render the device inoperative. Yoke 9 provides a means for positively maintaining the parallelogram formed by the balance beam, outrider stems, and check rods. The type of bearing used between the outrider stem, check rods and yoke, respectively, permits easy rocking motion with least possible friction. Each screw may be provided with a nut head for easy turning, and a lock-nut may be used on each in usual and well known manner. So assembled, the parallelogram will be perfectly maintained while, at the same time, friction, lost motion, binding, rust and fouling will be reduced to the extreme minimum. Disconnection of the few parts is greatly facilitated. It is only necessary to loosen one screw 12. Yoke 9 then drops off, rods 7 drop out, and the other parts are readily and quickly disconnected. While the yoke illustrated is the preferred and a very simple construction, it will be obvious that a variety of other devices may be used for maintaining operative relation between stems 5 and rods 7 and the term yoke is intended in its broad sense and to include all such. Check rod 7 and the yoke 9 or other device for maintaining operative position of the check rod, together with the securing screws or the like, may be considered as a unit and briefly designated as the check rod assembly.

Now, assume the parts assembled for operation, with yoke 9 in position and the weights of the platters equal. The beam will be balanced, as in Fig. 1. Heretofore, such balanced condition has been indicated by a long index needle traversing a chart and resting at zero or other proper indication. This requires a considerable "tower" construction which, in addition to the extra mechanism and added cost, takes up considerable space. In the present invention, a far simpler and totally different means has been devised. It comprises a device in the nature of a spirit-level or level tube, but so specially constructed and combined with the moving parts as to give quickly an accurate over and under weight reading with satisfactory sensitivity or responsiveness of the beam to slight variations. In the preferred form, a level tube or bubble tube 15 is used. This tube is sufficiently long to permit adequate travel of its bubble for practical cooperation with a scale or chart having graduations of ample size and spacing to be readily observed. Tube 15, however, is not a simple straight level-tube, though it does contain the liquid and bubble of such tubes. It is curved to the arc of a circle, for purposes to be later disclosed. While the degree of curvature, or radius of the circle may be varied somewhat, it should be not so slight or the radius so great as to closely approach a straight line, as that would render the device too sensitive and quick acting for practical use; nor should the curvature be so sharp or the radius so short as to render the device slow or lacking in sensitiveness. For instance, in scales of this type in which the distance between outrider stems is from eight to fourteen inches, approximately, and the extreme travel of the stem, respectively, about three-quarters of an inch to one inch, a good practical radius of tube 15 could be approximately fifty inches. Preferably, though not essentially, this tube may be carried directly on the beam 4. It may be mounted in a frame and the frame mounted on the beam. It should be so disposed that its longitudinal center will lie in the radius of the beam fulcrum, as close to that fulcrum as practical, and with its two ends in a plane parallel with the beam. With such a disposition, when the beam is balanced, the longitudinal center of the tube 15 will be its high point and, necessarily, the high point of the column of liquid contained in the tube. From that point toward either end, the tube curves downwardly. Consequently, the bubble will gravitate to this high point which will be the zero, starting, or balance point, on an over and under chart disposed adjacent the tube and moving with the beam. As the beam moves, the tube is rocked about the beam fulcrum so that one or the other end rises above the zero point. The bubble then gravitates to rest in the highest point of the tube. Its travel in the tube from the zero point will, of course, be proportionate to the movement of the beam and that, in turn, is proportionate to the variation in weight. Consequently, by suitably providing the tube, or a plate adjacent the tube, with tolerance marks, an excess or deficiency is at once clearly indicated. One simple, practical and efficient way of mounting the tube is a U-shaped bracket 16 bolted or otherwise suitably secured to the beam 4 and provided with small openings in its ends or branches 17 to partially receive the substantially spherical ends of the tube 15. The diameter of the holes is considerably less than that of the tube, permitting the tube ends to freely but securely seat therein. The branches of the bracket are slightly resilient or springy, so that they may be sprung apart sufficiently to receive the tube but, when released, will return and yieldingly hold or secure the tube in position and against removal. As further accurately maintaining position of the tube, a saddle plate 18 is provided, comprising a central substantially semi-cylindrical seat 19 shaped to receive the upper half of the tube, as under a saddle. From either side of seat 19 are upwardly and outwardly extending wings 20 which are suitably secured to the respective beam side members, as by screws or the like passed therethrough and into the beam member. When secured in place, this saddle plate cooperates with bracket 16 to positively maintain upright or operative position of tube 15. In this, the preferred form, the saddle plate 18 is cut away or slotted along its upper surface to adequately expose the tube and bubble therethrough throughout the entire travel of the bubble. Either or both wings 20 may be provided with the above tolerance marks adjacent the tube opening. Or the tube itself may be so provided.

With an evenly balanced beam mounted on knife-edges, the frequency, amplitude and duration of oscillations renders rapid weighing impossible. That is one reason for the torsion resistance used in the Smith patent scale referred to. It is also a reason for the dash-pot connected to the beam.

In the present invention a different, simpler, more efficient, more compact and more economical means has been devised for counteracting these oscillations. It comprises a pendulum weight 21 suspended from the beam 4 by rods 22. The assembly is such that the center of mass of the weight 21 is substantially in the same plane as the beam fulcrum. The pendulum effect may be varied as desired by nuts 23 threaded onto the ends of the rods 22 which pass through the weight. In this way, the effective length of the pendulum rods 22 may be regulated. The pendulum will gravitate the beam to final position, reducing the number, amplitude and duration of the oscillations.

The pendulum gravitation to final position, combined with the bubble tube gravitation to corresponding reading position provide a simple, efficient and quick, accurate weight reading with the least practical number of parts and the least required space. At the same time, it completely eliminates all stresses such as are set up in corresponding torsional or similar resilient counteracting devices.

Figure 7:
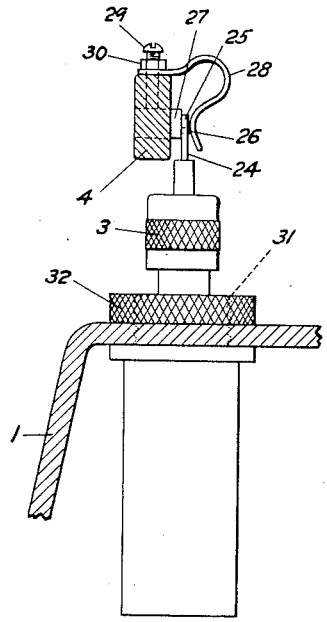

In order to dampen the beam oscillations, a dash-pot is used, as shown in detail in Fig. 7. Dash-pots have long been used in this manner. In the present instance, the rod or stem 24 of the dash-pot is provided with an eye or small opening 25 adapted to freely receive a small connecting or coupling pin 26 carried by one end of the small cylinder or rod 27 which is revolubly and removably seated in a bore in one side of the beam 4. This bore is so positioned, of course, that when the parts are all assembled, the pin 26 will extend through the eye 25. To allow for slight inaccuracies, the pin 26 is eccentrically disposed relatively to the axis of rod 27 which may have a slotted outer end to receive a screw driver for partial rotation. Slight adjustment of pin 26 toward or from the beam fulcrum will eliminate any tendency toward binding, due to any slight inaccuracy in mounting the dash-pot. Cooperating with the pin 26 is a small strong leaf spring clip 28, secured to beam 4 by a set screw 29 and lock nut 30. Also, set screw 29 extends through the beam 4 and into securing position for rod 27. Thus, set screw 29 acts both as a means to secure and bind the spring clip to beam 4, and to bind the rod 27 in its bore. Spring clip 28 acts to resiliently, yieldingly engage the free end of pin 26 and maintain the stem 24 in operative position. But, because it is resilient, it may be "sprung" to permit ready connection and disconnection. Stem 24, of course, carries the usual piston or head which reciprocates in the pot body or cylinder which is provided with a threaded extension 31 of reduced diameter adapted to be passed upwardly through a bore of corresponding diameter in the scale base. In order to secure the pot in place a collar 32 is turned onto the extension 31 above the base until it clamps the pot against the under side of the base. Of course, the regulating ferrule 33 on the sleeve of stem 22 for increasing or decreasing the dampening effect of the dash-pot is also of such a diameter as to pass freely through the opening in the base. It will be seen that the whole dash-pot assembly, as a unit, may be easily removed downwardly through the base by simply turning off the collar 32.

In some instances the scale may be set on inclined or uneven surfaces where one end will be somewhat higher than the other. To correct this or "level" the scale, the jack screw 34 is provided, threaded through a lug or ear at one end of the base. Preferably, it carries a foot or plate 35 swivelled on its lower end to avoid marring the surface. Also, a stop nut 36 may be used to set or limit the travel of the jack screw in usual and well known manner.

In the present invention it will be seen there are no torsional, resilient or elastic stresses or strains set up or generated in the operation of the scale. Repeated stressing and flexing of a metal part tend to crystallize the metal and seriously affect its properties so that it becomes increasingly deficient in its operation. No such trouble or objection is possible in the present invention.

The present invention combines in one construction the simplest practical cooperative assembly of gravity actuated indicator with a gravity actuated balancing device. Both elements act by gravity from and about the same point—the knife-edge pivot. As the pendulum gravitates the beam toward balance, the bubble of the level gravitates toward zero, and vice versa.

The construction, operation and use of the invention will be clear from the preceding detailed description.

Many changes may be made in the construction, arrangement and disposition of the various parts of the invention within the scope of the appended claims, without in any way departing from the field of the invention, and it is meant to include all such within this application wherein only the single and simplest form of construction and application of the invention has been illustrated, purely as an example and with no thought or intention of limiting the invention thereby, in any degree.

Having thus described my invention, what I claim and desire to protect by Letters Patent is:

1. In a scale, a pivotally mounted beam and an arcuate level carried by said beam, extending longitudinally of said beam, and having its longitudinal center above and substantially adjacent to the fulcrum of said beam.

2. In a scale, a pivotally mounted beam and an arcuate level carried by said beam, extending longitudinally of said beam and having its longitudinal center above and substantially adjacent to the fulcrum of said beam, the curvature of said level bearing a definite relation to the distance between the beam fulcrum and the outrider fulcrum.

3. In a scale, a pivotally mounted beam and an arcuate level carried by said beam, extending longitudinally of said beam and having its longitudinal center above and substantially adjacent to the fulcrum of said beam, the curvature of said level bearing a definite relation both to the distance travelled by said beam, and to the distance between the beam fulcrum and the outrider fulcrum.

4. In a scale, a pivotally mounted beam, an outrider pivotally carried on said beam, an arcuate level carried by said beam in a plane parallel with the swing of said beam and having its longitudinal center above and substantially adjacent to the fulcrum of said beam, said level having a radius of curvature proportioned to the distance between beam fulcrum and outrider fulcrum.

5. In a scale a pivotally mounted beam, an arcuate level having a curvature the radius of which bears a predetermined ratio to the distance between fulcrum and outrider of said beam, and means for mounting said level concentrically relatively to said fulcrum and with its longitudinal center above said fulcrum.

6. In a scale, a pivotally mounted beam, an arcuate level having a curvature the radius of which bears a predetermined ratio to the distance between fulcrum and outrider of said beam, and means for mounting said level concentrically relatively to said fulcrum and with its longitudinal center above said fulcrum and substantially adjacent thereto.

7. In a scale, a pivotally mounted beam, an arcuate level having a curvature the radius of which bears a predetermined ratio to the distance travelled by said beam, and means for mounting said level concentrically relatively to the beam fulcrum, and with its longitudinal center and its highest point and the highest point of its contained liquid column above and substantially adjacent to said fulcrum.

8. In a scale, a pivotally mounted beam, an arcuate level having a curvature the radius of which bears a predetermined ratio to the beam length and to the beam travel, and means for mounting said level concentrically relatively to the beam fulcrum and with its longitudinal center and its highest point and the highest point of its contained liquid column above and substantially adjacent to said fulcrum.

THOMAS B. FLANAGAN.